(12) United States Patent
Kikuchi et al.

(10) Patent No.: US 9,694,845 B2
(45) Date of Patent: Jul. 4, 2017

(54) MOTOR CONTROL DEVICE, ELECTRIC POWER STEERING DEVICE, AND VEHICLE

(71) Applicant: NSK LTD., Tokyo (JP)

(72) Inventors: Yusuke Kikuchi, Kanagawa (JP); Gen Kimura, Kanagawa (JP); Zhipeng Tu, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/118,579

(22) PCT Filed: Mar. 19, 2015

(86) PCT No.: PCT/JP2015/058329
§ 371 (c)(1),
(2) Date: Aug. 12, 2016

(87) PCT Pub. No.: WO2015/141795
PCT Pub. Date: Sep. 24, 2015

(65) Prior Publication Data
US 2017/0050668 A1    Feb. 23, 2017

(30) Foreign Application Priority Data

Mar. 20, 2014 (JP) .................. 2014-058947

(51) Int. Cl.
*H02P 6/10* (2006.01)
*B62D 5/04* (2006.01)
(Continued)

(52) U.S. Cl.
CPC ........... *B62D 5/0463* (2013.01); *H02K 1/146* (2013.01); *H02K 1/27* (2013.01); *H02K 3/28* (2013.01);
(Continued)

(58) Field of Classification Search
CPC .... H02P 6/10; H02P 6/17; H02P 27/08; H02P 25/03; B62D 5/0463; H02K 1/146; H02K 1/27; H02K 3/28
(Continued)

(56) References Cited

U.S. PATENT DOCUMENTS 7,126,309 B1 * 10/2006 Takeuchi ............... H02K 21/24
310/156.01
7,806,225 B2    10/2010 Itoh
(Continued)

FOREIGN PATENT DOCUMENTS

JP    06-197593 A    7/1994
JP    2006-191757 A    7/2006
(Continued)

OTHER PUBLICATIONS

Decision to Grant Patent for JP 2015-532214 dated Apr. 5, 2016.
(Continued)

*Primary Examiner* — Joseph Rocca
*Assistant Examiner* — Daniel Yeagley
(74) *Attorney, Agent, or Firm* — Sughrue Mion, PLLC

(57) ABSTRACT

A motor control device includes a motor, a control device, and a motor drive circuit. The motor includes a motor rotor, a motor stator, and a plurality of coil groups divided into a first coil group and a second coil group of at least two systems for each of three phases, and configured to excite a stator core by three-phase alternating currents. In the motor drive circuit, a first motor drive circuit supplies a three-phase AC first motor drive current to the first coil group based on a command value, and a second motor drive circuit supplies a three-phase AC second motor drive current having a phase difference from a phase of the first motor drive current, to the second coil group.

5 Claims, 12 Drawing Sheets

(51) Int. Cl.

| | | |
|---|---|---|
| *H02P 25/22* | (2006.01) | |
| *H02P 27/08* | (2006.01) | |
| *H02K 3/28* | (2006.01) | |
| *H02P 6/17* | (2016.01) | |
| *H02P 25/03* | (2016.01) | |
| *H02K 1/14* | (2006.01) | |
| *H02K 1/27* | (2006.01) | |
| *H02K 16/04* | (2006.01) | |

(52) U.S. Cl.
CPC .................. *H02P 6/10* (2013.01); *H02P 6/17* (2016.02); *H02P 25/03* (2016.02); *H02P 25/22* (2013.01); *H02P 27/08* (2013.01); *H02K 16/04* (2013.01); *H02K 2213/06* (2013.01)

(58) Field of Classification Search
USPC .............. 318/139, 722, 727, 801, 808, 599, 318/400.26, 400.13, 496; 310/71, 179, 310/184, 185, 195, 198; 180/65.285, 446
See application file for complete search history.

(56) References Cited

U.S. PATENT DOCUMENTS

| | | | |
|---|---|---|---|
| 8,269,434 B2 | 9/2012 | Welchko et al. | |
| 8,487,497 B2 | 7/2013 | Taniguchi | |
| 9,225,279 B2 | 12/2015 | Kimpara et al. | |
| 2010/0071970 A1 | 3/2010 | Welchko et al. | |
| 2010/0072928 A1 | 3/2010 | Welchko | |
| 2011/0043069 A1* | 2/2011 | Tanaka | H02K 3/28 310/198 |
| 2011/0074323 A1* | 3/2011 | Mukai | B62D 5/0463 318/400.21 |
| 2011/0285226 A1* | 11/2011 | Fujita | H01L 23/49562 310/71 |
| 2011/0315470 A1* | 12/2011 | Uryu | B62D 5/0487 180/446 |
| 2012/0049781 A1* | 3/2012 | Suzuki | H02P 21/50 318/722 |
| 2012/0187893 A1* | 7/2012 | Baba | H02P 25/021 318/722 |

FOREIGN PATENT DOCUMENTS

| | | |
|---|---|---|
| JP | 2007-331639 A | 12/2007 |
| JP | 2012-125006 A | 6/2012 |
| JP | 2013-153619 A | 8/2013 |

OTHER PUBLICATIONS

Notice of Rejection for JP 2015-532214 dated Nov. 4, 2015.
International Search Report for PCT/JP2015/058329 dated May 26, 2015.

* cited by examiner

MOTOR CONTROL DEVICE, ELECTRIC POWER STEERING DEVICE, AND VEHICLE

CROSS-REFERENCE TO RELATED APPLICATION

This application is a National Stage of PCT international application No. PCT/JP2015/058329 filed on Mar. 19, 2015, which designates the United States, incorporated herein by reference, and which is based upon and claims the benefit of priority from Japanese Patent Application No. 2014-058947 filed on Mar. 20, 2014, the entire contents of which are incorporated herein by reference.

BACKGROUND OF THE INVENTION

Field of the Invention

The present invention relates to a motor control device, an electric power steering device, and a vehicle.

Description of the Related Art

A steering device motor is publicly known as a motor in which coils of a stator are divided into two systems, and even if one system fails, the remaining one system can rotate a rotor. For example, Prior Art 1 describes a steering device motor in which a plurality of magnetic pole bodies that constitute a stator are divided into two groups including a system A group and a system B group. In Prior Art 1, the system A includes a system A-1 including a plurality of magnetic pole bodies continuously arranged and a system A-2 including a plurality of magnetic pole bodies arranged in a state of facing the magnetic pole bodies belonging to the system A-1 in a diameter direction. The same applies to the system B.

CITATION LIST

Prior Art

Prior Art 1: Japanese Laid-open Patent Publication No. 2007-331639

In the steering device motor described in Prior Art 1, if the system B group of the two groups fails, the motor is driven only by the system A group. However, since the system A-1 and the system A-2 are arranged to face each other in the diameter direction, variation in positions where torque is generated in a circumferential direction becomes large.

The present invention has been made in view of the above, and is directed to providing a motor control device, an electric power steering device, and a vehicle that can suppress torque ripple when coil groups of at least two systems excited independently of each other are excited at the same time.

SUMMARY OF THE INVENTION

In order to solve the above-mentioned problems and achieve the purpose, there is provided a motor control device comprising: a motor including: a motor rotor; a motor stator including a stator core that rotates the motor rotor; and a plurality of coil groups divided into a first coil group and a second coil group of at least two systems for each of three phases, and configured to excite the stator core by three-phase alternating currents; and a motor drive circuit including: a control device that outputs a current value as a command value for rotating and driving the motor rotor; a first motor drive circuit that supplies a three-phase AC first motor drive current to the first coil group, based on the command value; and a second motor drive circuit that supplies a three-phase AC second motor drive current having a phase difference from a phase of the first motor drive current, to the second coil group.

With the above-described configuration, the motor control device can suppress the torque ripple when the two coil groups of at least two systems excited independently of each other are excited at the same time.

According to a preferred aspect, it is preferable that the control device includes: a control unit that calculates a pulse width modulation signal with a predetermined duty ratio as the command value; and a phase difference adjusting unit that calculates a second pulse width modulation signal from a first pulse width modulation signal that is the pulse width modulation signal with the predetermined duty ratio, such that the second pulse width modulation signal has the same duty ratio as the first pulse width modulation signal, and has a phase difference from the first pulse width modulation signal.

With the above-described configuration, the phase difference adjusting unit of the control device can adjust the phase difference in a range where the decreasing rate of torque ripple is larger than the decreasing rate of average torque, and the motor can perform control to provide rotation with decreased torque ripple to the motor rotor. Further, the phase difference adjusting unit can perform control to approximate the phase difference to 0 to increase the average torque, and increase the phase difference to decrease the torque ripple.

According to a preferred aspect, it is preferable that the first motor drive circuit supplies the first motor drive current to the first coil group by PWM control of the first pulse width modulation signal, and the second motor drive circuit supplies the second motor drive current to the second coil group by PWM control of the second pulse width modulation signal.

With the above-described configuration, the first motor drive circuit and the second motor drive circuit that are independent from each other are provided, whereby redundancy is enhanced, and fail safety of the motor drive circuit can be enhanced.

According to a preferred aspect, it is preferable that the phase difference does not exceed 45° in electrical angle. Accordingly, a decrease in the average torque can be suppressed.

According to a preferred aspect, it is preferable to provide an electric power steering device configured to obtain auxiliary steering torque by the motor of the above-described motor control device. With this structure, the torque ripple can be suppressed when the coil groups of at least two systems excited independently of each other are excited at the same time. Therefore, the electric power steering device lowers a possibility of causing an operator to feel vibration due to the torque ripple, and making the operator uncomfortable. Therefore, the electric power steering device can allow a steerer to operate a vehicle while preventing the steerer from feeling uncomfortable. As a result, the electric power steering device can provide comfortable steering feeling to the operator.

According to a preferred aspect, it is preferable to provide a vehicle on which the above-described electric power steering device is mounted.

According to the present invention, it is possible to provide a motor control device, an electric power steering device, and a vehicle that suppress torque ripple when coil groups of at least two systems excited independently of each other are excited at the same time.

DETAILED DESCRIPTION OF THE PREFERRED EMBODIMENT

Modes (embodiments) for implementing the present invention will be described in detail with reference to the drawings. The present invention is not limited by content described in the embodiments. The configuration elements described below include those easily conceived by a person skilled in the art and those substantially the same. Further, the configuration elements described below can be appropriately combined.

First Embodiment (Electric Power Steering Device)

Figure 1:
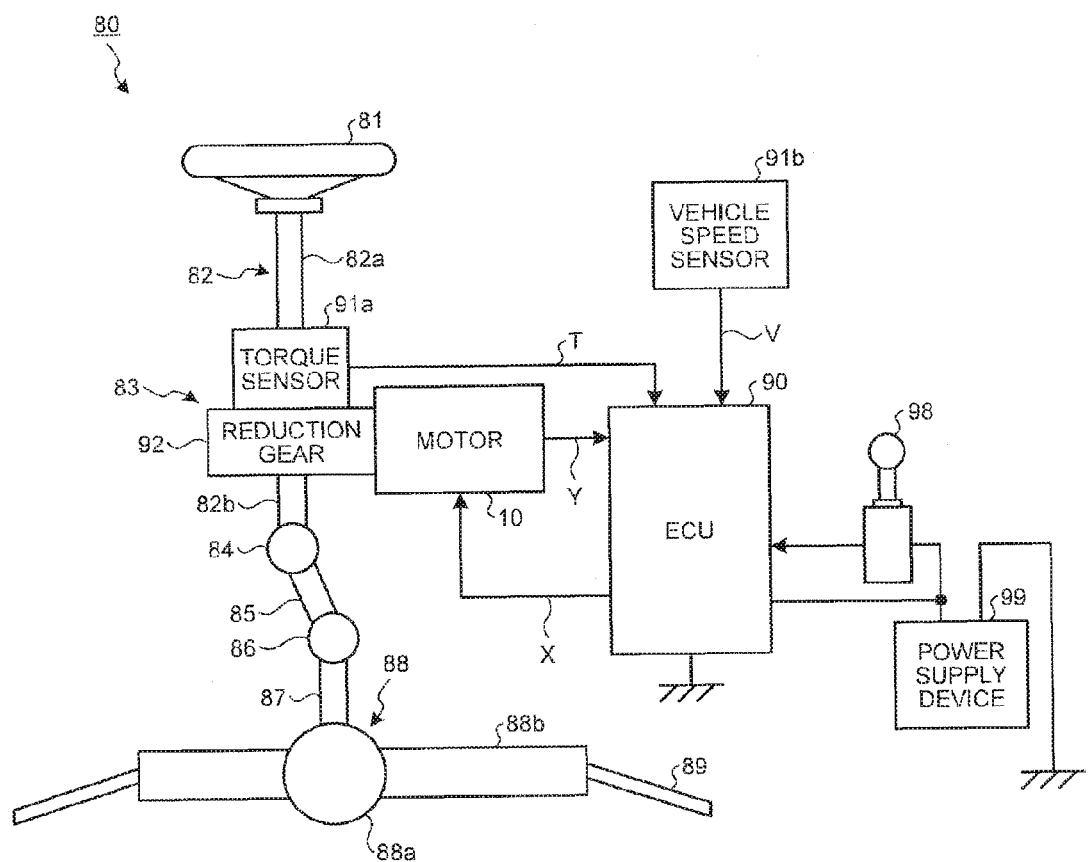
FIG. 1 is a configuration diagram of an electric power steering device including a motor according to a first embodiment.

FIG. 1 is a configuration diagram of an electric power steering device including a motor according to a first embodiment. In the first embodiment, an outline of an electric power steering device 80 including a motor 10 will be described with reference to FIG. 1.

The electric power steering device 80 includes, in transmission order of force supplied from a steerer, a steering wheel 81, a steering shaft 82, a steering force assist mechanism 83, a universal joint 84, a lower shaft 85, a universal joint 86, a pinion shaft 87, a steering gear 88, and a tie rod 89. Further, the electric power steering device 80 includes an ECU (Electronic Control Unit) 90, a torque sensor 91a, and a vehicle speed sensor 91b.

The steering shaft 82 includes an input shaft 82a and an output shaft 82b. The input shaft 82a has one end portion coupled with the steering wheel 81, and the other end portion coupled with the steering force assist mechanism 83 through the torque sensor 91a. The output shaft 82b has one end portion coupled with the steering force assist mechanism 83, and the other end portion coupled with the universal joint 84. In the first embodiment, the input shaft 82a and the output shaft 82b are formed of a magnetic material such as iron.

The lower shaft 85 has one end portion coupled with the universal joint 84, and the other end portion coupled with the universal joint 86. The pinion shaft 87 has one end portion coupled with the universal joint 86, and the other end portion coupled with the steering gear 88.

The steering gear 88 includes a pinion 88a and a rack 88b. The pinion 88a is coupled with the pinion shaft 87. The rack 88b is meshed with the pinion 88a. The steering gear 88 is configured as a rack and pinion system. The steering gear 88 converts rotary movement transmitted to the pinion 88a into translatory movement in the rack 88b. The tie rod 89 is coupled with the rack 88b.

The steering force assist mechanism 83 includes a reduction gear 92 and a motor 10. The reduction gear 92 is coupled with the output shaft 82b. The motor 10 is a motor that is coupled with the reduction gear 92 and that generates auxiliary steering torque. A steering column of the electric power steering device 80 is constituted of the steering shaft 82, the torque sensor 91a, and the reduction gear 92. The motor 10 provides the auxiliary steering torque to the output shaft 82b of the steering column. That is, the electric power steering device 80 of the first embodiment employs a column assist system.

In the electric power steering device 80 in the column assist system, the distance between an operator and the motor 10 is relatively short, and torque change or friction force of the motor 10 may affect the steerer. Therefore, the electric power steering device 80 is required to decrease the friction force of the motor 10.

Figure 2:
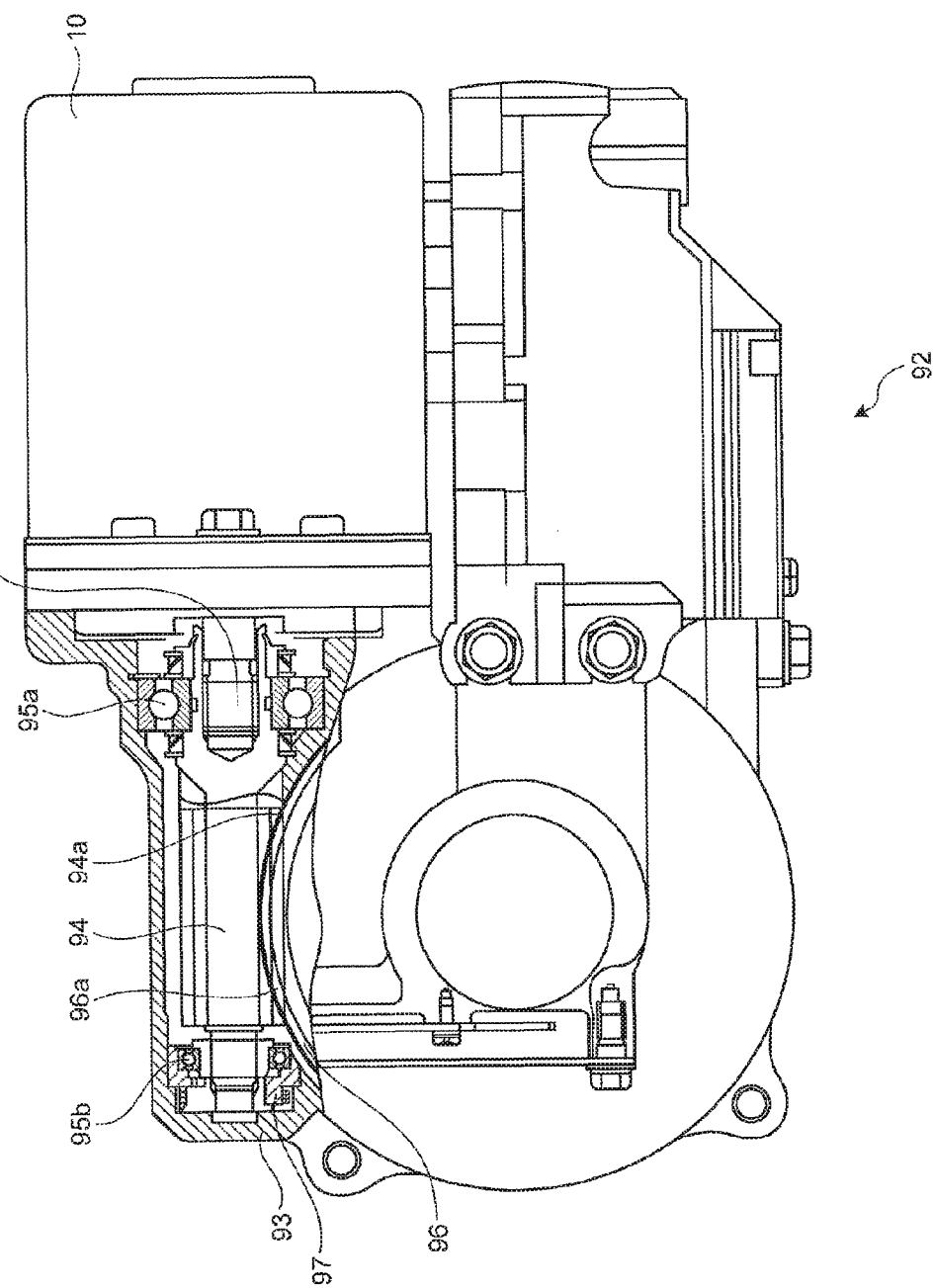
FIG. 2 is a front view for explaining an example of a reduction gear included in the electric power steering device of the first embodiment.

FIG. 2 is a front view for explaining an example of the reduction gear included in the electric power steering device of the first embodiment. A part of FIG. 2 is illustrated as a cross section. The reduction gear 92 is a worm reduction gear. The reduction gear 92 includes a reduction gear housing 93, a worm 94, a ball bearing 95a, a ball bearing 95b, a worm wheel 96, and a holder 97.

The worm 94 is coupled with a shaft 21 of the motor 10 through a spline coupling or an elastic coupling. The worm 94 is rotatably held in the reduction gear housing 93 by the ball bearing 95a and the ball bearing 95b that is held in the holder 97. The worm wheel 96 is rotatably held in the reduction gear housing 93. Worm teeth 94a formed in a part of the worm 94 are meshed with worm wheel teeth 96a formed in the worm wheel 96.

Rotating force of the motor 10 is transmitted to the worm wheel 96 through the worm 94, which rotates the worm wheel 96. The reduction gear 92 increases the torque of the motor 10 by the worm 94 and the worm wheel 96. The reduction gear 92 then provides the auxiliary steering torque to the output shaft 82*b* of the steering column illustrated in FIG. 1.

The torque sensor 91*a* illustrated in FIG. 1 detects steering force of a driver, which has been transmitted to the input shaft 82*a* through the steering wheel 81, as steering torque. The vehicle speed sensor 91*b* detects travel speed of a vehicle on which the electric power steering device 80 is mounted. The motor 10, the torque sensor 91*a*, and the vehicle speed sensor 91*b* are electrically connected to the ECU 90.

The ECU 90 controls an operation of the motor 10. Further, the ECU 90 acquires signals each from the torque sensor 91*a* and the vehicle speed sensor 91*b*. That is, the ECU 90 acquires steering torque T from the torque sensor 91*a*, and acquires travel speed V of the vehicle from the vehicle speed sensor 91*b*. The ECU 90 is supplied with power from a power supply device (for example, an in-vehicle battery) 99 when an ignition switch 98 is in an ON-state. The ECU 90 calculates an auxiliary steering command value of an assist command based on the steering torque T and the travel speed V. The ECU 90 then adjusts a power value X to be supplied to the motor 10, based on the calculated auxiliary steering command value. The ECU 90 acquires information of an induced voltage from the motor 10 or information of rotation of a rotor from a resolver to be described below, as operation information Y.

The steering force of the steerer (driver) input to the steering wheel 81 is transmitted to the reduction gear 92 of the steering force assist mechanism 83 through the input shaft 82*a*. At this time, the ECU 90 acquires the steering torque T input to the input shaft 82*a* from the torque sensor 91*a*, and acquires the travel speed V from the vehicle speed sensor 91*b*. The ECU 90 then controls an operation of the motor 10. The auxiliary steering torque produced by the motor 10 is transmitted to the reduction gear 92.

The steering torque T (including the auxiliary steering torque) output through the output shaft 82*b* is transmitted to the lower shaft 85 through the universal joint 84, and is further transmitted to the pinion shaft 87 through the universal joint 86. The steering force transmitted to the pinion shaft 87 is transmitted to the tie rod 89 through the steering gear 88, which steers a steering wheel. Next, the motor 10 will be described.

(Motor)

Figure 3:
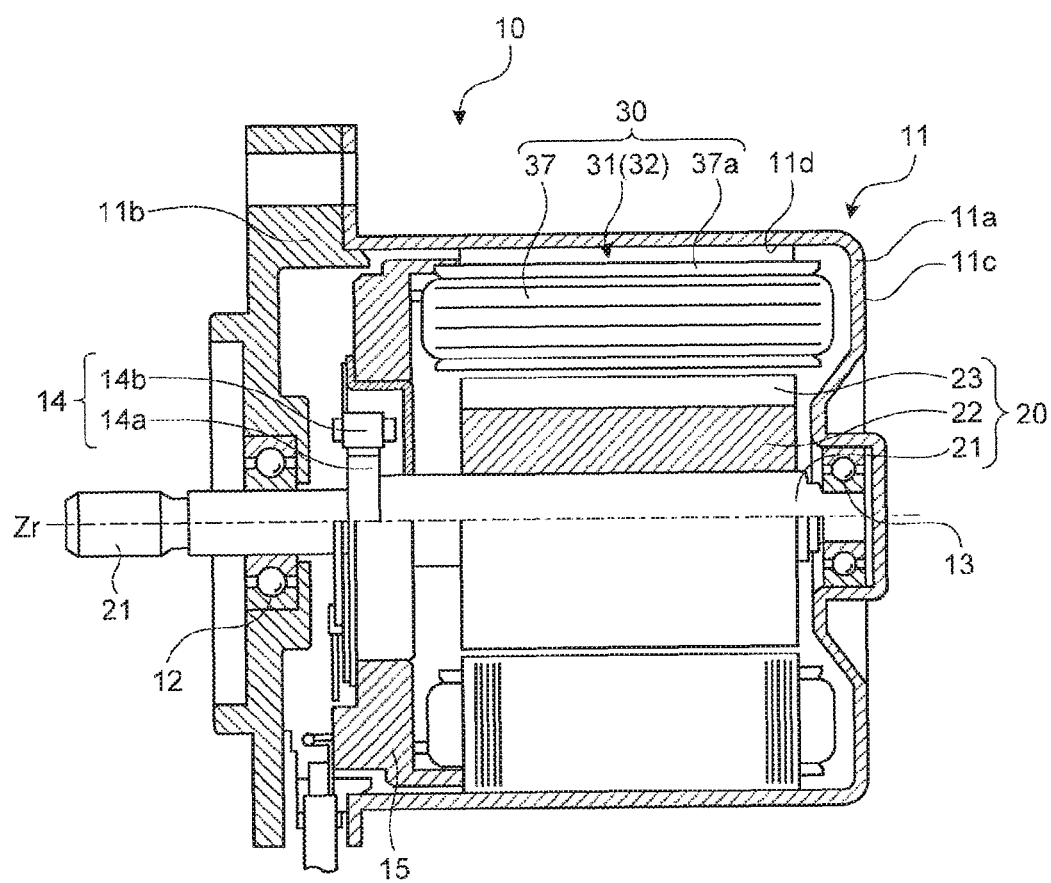
FIG. 3 is a sectional view schematically illustrating a configuration of the motor of the first embodiment by cutting the motor in a virtual plane including a central axis.
Figure 4:
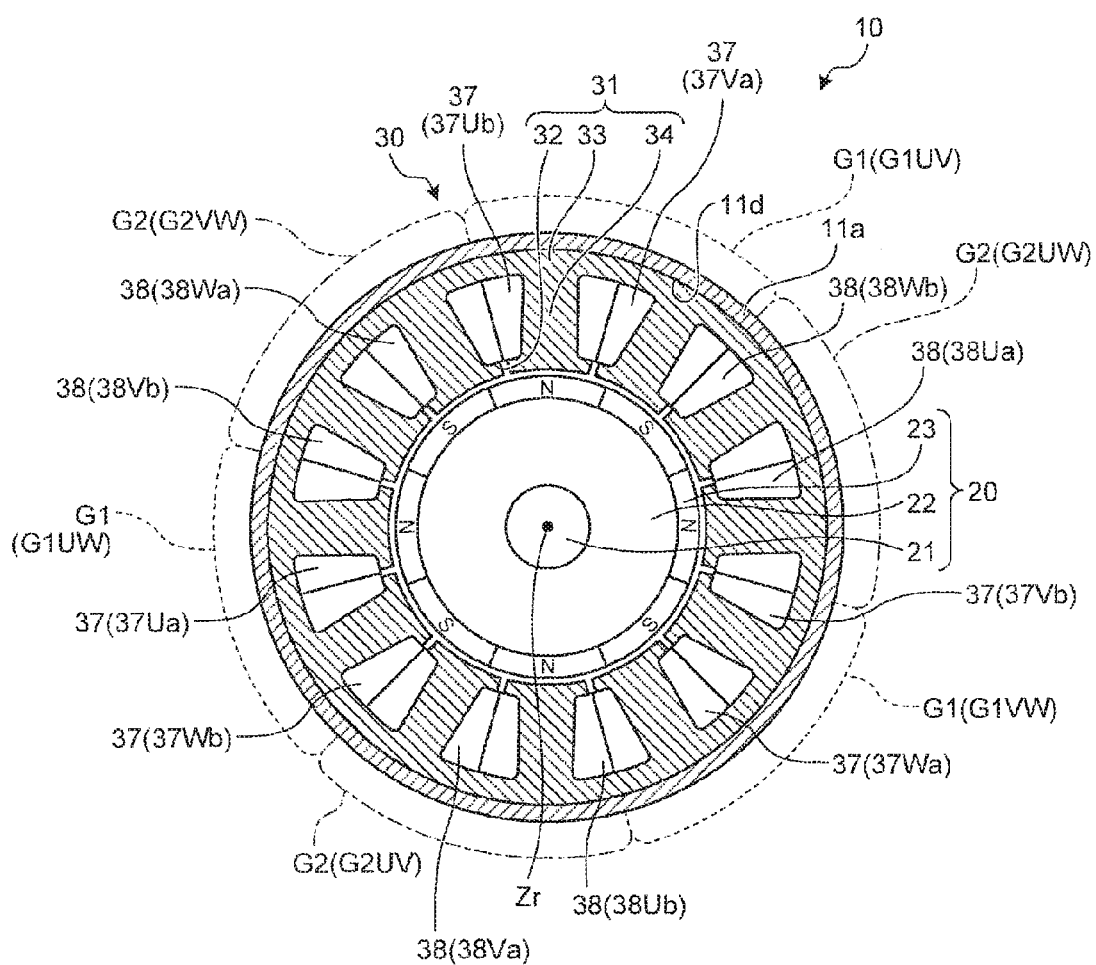
FIG. 4 is a sectional view schematically illustrating a configuration of the motor of the first embodiment by cutting the motor in a virtual plane perpendicular to the central axis.

FIG. 3 is a sectional view schematically illustrating a configuration of the motor of the first embodiment by cutting the motor in a virtual plane including a central axis. FIG. 4 is a sectional view schematically illustrating a configuration of the motor of the first embodiment by cutting the motor in a virtual plane perpendicular to the central axis. As illustrated in FIG. 3, the motor 10 includes a housing 11, a bearing 12, a bearing 13, a resolver 14, a motor rotor 20, and a motor stator 30 for a brushless motor.

The housing 11 includes a cylindrical housing 11*a* and a front bracket 11*b*. The front bracket 11*b* is formed in a substantially disk shape, and is attached to the cylindrical housing 11*a* so as to block one opening end portion of the cylindrical housing 11*a*. The cylindrical housing 11*a* has a bottom 11*c* formed so as to block an end portion at the opposite side of the front bracket 11*b*. The bottom 11*c* is integrally formed with the cylindrical housing 11*a*, for example. As a material forming the cylindrical housing 11*a*, for example, a typical steel material such as steel plate cold commercial (SPCC), electromagnetic soft iron, and aluminum can be employed. Further, the front bracket 11*b* serves as a flange when the motor 10 is attached to a desired device.

The bearing 12 is provided inside the cylindrical housing 11*a*, and at a substantially central portion of the front bracket 11*b*. The bearing 13 is provided inside the cylindrical housing 11*a*, and at a substantially central portion of the bottom 11*c*. The bearing 12 rotatably supports one end of the shaft 21 that is a part of the motor rotor 20 arranged inside the cylindrical housing 11*a*. The bearing 13 rotatably supports the other end of the shaft 21. Accordingly, the shaft 21 rotates around an axis as a rotation center Zr.

The resolver 14 is supported by a terminal table 15 provided at the front bracket 11*b* side of the shaft 21. The resolver 14 detects a rotation position of the motor rotor 20 (shaft 21). The resolver 14 includes a resolver rotor 14*a* and a resolver stator 14*b*. The resolver rotor 14*a* is attached to a circumferential surface of the shaft 21 by means of press-fitting or the like. The resolver stator 14*b* is arranged to face the resolver rotor 14*a* with a gap having a predetermined interval.

The motor rotor 20 is provided inside the cylindrical housing 11*a* so that the motor rotor 20 can rotate around the rotation center Zr with respect to the cylindrical housing 11*a*. The motor rotor 20 includes the shaft 21, a rotor yoke 22, and a magnet 23. The shaft 21 is formed in a cylindrical manner. The rotor yoke 22 is formed in a cylindrical manner. The rotor yoke 22 has an arc-shaped outer circumference. The configuration reduces machining man-hours for a punching process compared to a case where the outer circumference has a complicated shape.

The rotor yoke 22 is manufactured by laminating sheets such as an electrical steel sheet and a cold rolled steel sheet by means of bonding, a boss, or caulking. The rotor yoke 22 is formed by sequentially laminating sheets in a mold and is discharged from the mold. The rotor yoke 22 is fixed to the shaft 21 by press-fitting the shaft 21 into a hollow portion of the rotor yoke 22, for example. The shaft 21 and the rotor yoke 22 may be integrally formed.

The magnet 23 is fixed on a surface of the rotor yoke 22 along a circumferential direction of the rotor yoke 22, and a plurality of magnets 23 are provided. The magnets 23 are permanent magnets, and S poles and N poles are alternately arranged in the circumferential direction of the rotor yoke 22 at regular intervals. Accordingly, the N poles and the S poles are alternately arranged on an outer circumferential side of the rotor yoke 22 in the circumferential direction of the rotor yoke 22, and the number of poles of the motor rotors 20 illustrated in FIG. 4 is eight.

The motor stator 30 is provided in a cylindrical manner to surround the motor rotor 20 inside the cylindrical housing 11*a*. The motor stator 30 is fitted into an inner circumferential surface 11*d* of the cylindrical housing 11*a*, for example, so that the motor stator 30 is attached thereto. A central axis of the motor stator 30 coincides with the rotation center Zr of the motor rotor 20. The motor stator 30 includes a cylindrical stator core 31, a plurality of first coils 37, and a plurality of second coils 38.

As illustrated in FIG. 4, the stator core 31 includes an annular back yoke 33, and a plurality of teeth 34 arranged side by side in a circumferential direction around the rotation center Zr on an inner circumferential surface of the back yoke 33. In the description below, the circumferential direction around the rotation center Zr (circumferential direction of the stator core 31) is simply described as the circumferential direction. The stator core 31 is formed of a magnetic material such as electrical steel. The stator core 31 is formed such that a plurality of core pieces formed in the substantially same shape are laminated and bundled in an axial direction parallel to the axis of the rotation center Zr. The back yoke 33 is, for example, a cylindrical member. The teeth 34 protrude from the inner circumferential surface of the back yoke 33. In the first embodiment, the twelve teeth 34 are arranged in the circumferential direction. The tooth 34 includes a tooth tip 32 at a top portion opposite to the back yoke 33. The tooth tip 32 protrudes from the tooth 34 in the circumferential direction. The teeth 34 face an outer circumferential surface of the rotor yoke 22. The stator core 31 is annularly arranged outside the rotor yoke 22 in a radial direction with a predetermined interval.

The stator core 31 is press-fitted into the cylindrical housing 11a, so that the motor stator 30 is provided inside the cylindrical housing 11a in an annular state. The stator core 31 and the cylindrical housing 11a may be fixed to each other by means of bonding, shrink-fitting, or welding, other than the press-fitting.

As illustrated in FIG. 4, the first coils 37 are respectively wound around the teeth 34 in a concentrated manner. The first coil 37 is wound around an outer circumference of the tooth 34 in a concentrated manner through an insulator 37a (refer to FIG. 3). The insulator 37a is a member for insulating the first coil 37 and the stator core 31 from each other, and is formed of a heat resistant member. All of the first coils 37 are included in a first coil system that is excited by the same inverter (a first inverter 52 described below). In the first embodiment, the first coil system includes six first coils 37, for example. The six first coils 37 are arranged such that two first coils 37 are adjacent to each other in the circumferential direction. Three first coil groups G1, each including the adjacent two first coils 37 as one group, are arranged in the circumferential direction at regular intervals. That is, the first coil system includes the three first coil groups G1 arranged in the circumferential direction at regular intervals. The number of the first coil groups G1 is not necessarily three, and may be 3n where n is an integer, i.e., 3n first coil groups G1 are arranged in the circumferential direction at regular intervals. In addition, n is desirably an odd number.

As illustrated in FIG. 4, the second coils 38 are respectively wound around a plurality of teeth 34 in a concentrated manner. The second coil 38 is wound around an outer circumference of the tooth 34 through an insulator in a concentrated manner. The teeth 34 around which the second coils 38 are wound in a concentrated manner are different from the teeth 34 around which the first coils 37 are wound in a concentrated manner. All of the second coils 38 are included in a second coil system that is excited by the same inverter (a second inverter 54 described below). In the first embodiment, the second coil system includes six second coils 38, for example. The six second coils 38 are arranged such that two second coils 38 are adjacent to each other in the circumferential direction. Three second coil groups G2, each including the adjacent two second coils 38 as one group, are arranged in the circumferential direction at regular intervals. That is, the second coil system includes three second coil groups G2 arranged in the circumferential direction at regular intervals. The number of the second coil groups G2 is not necessarily three, and may be 3n where n is an integer, i.e., 3n second coil groups G2 are arranged in the circumferential direction at regular intervals where n is an integer. In addition, n is desirably an odd number.

Figure 5:
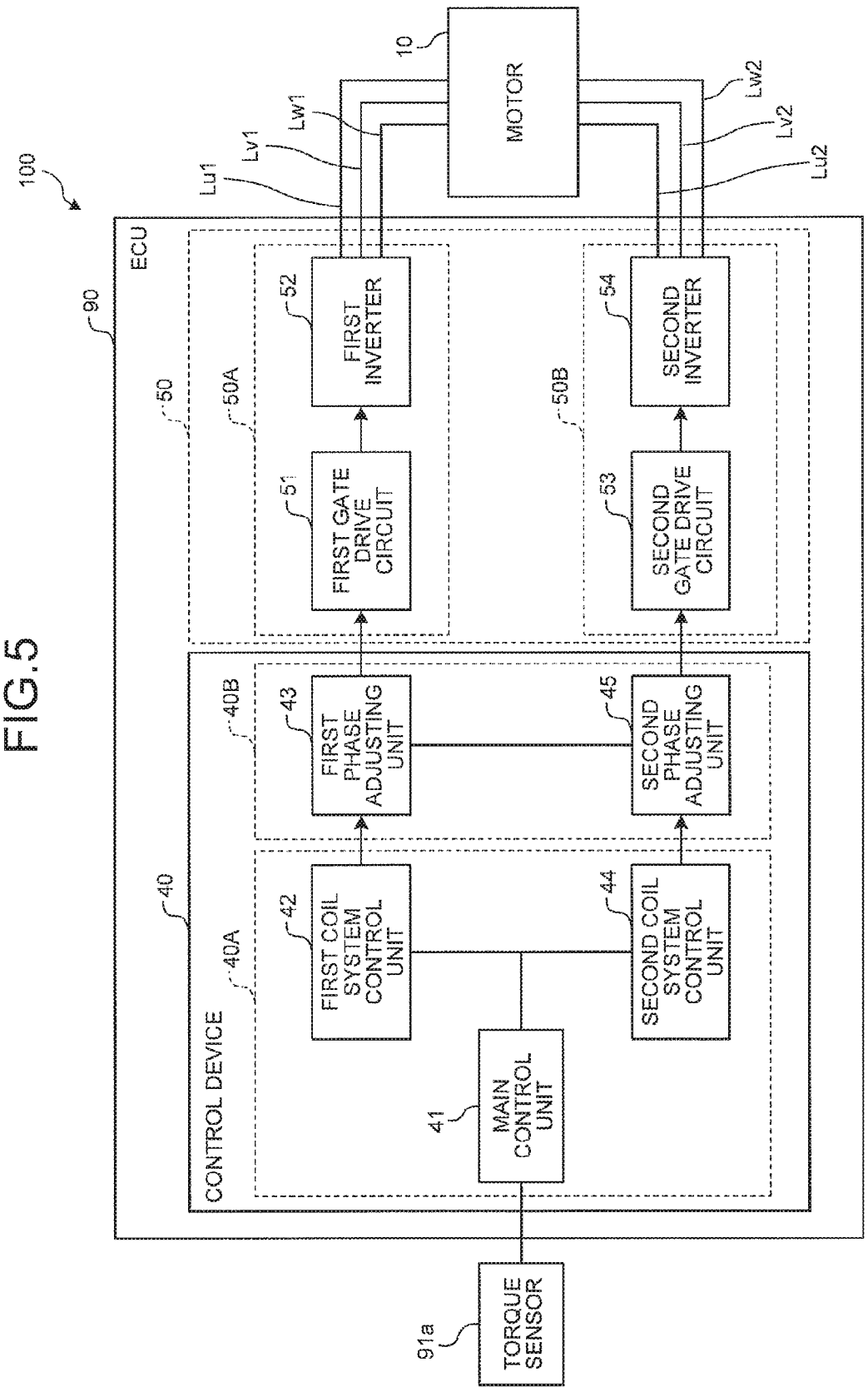
FIG. 5 is a schematic diagram for explaining drive of the motor by an ECU.

FIG. 5 is a schematic diagram for explaining drive of the motor by the ECU. A motor control device 100 includes the ECU 90 and the motor 10. The motor control device 100 can input an input signal from a sensor such as the torque sensor 91a to the ECU 90, for example. The ECU 90 controls the operation of the motor 10 by three-phase alternating currents. The ECU 90 includes a control device 40 that controls the motor 10 and a motor drive circuit 50. The control device 40 outputs a current value as a command value for rotating and driving the motor rotor 20. The motor drive circuit 50 is a power supply circuit that generates a pulse width modulation signal with a predetermined duty ratio, which is called PWM (Pulse Width Modulation), based on the command value of the control device 40, and that outputs a three-phase alternating current signal for controlling a current value of the motor 10. The motor drive circuit 50 only needs to be electrically connected with the control device 40, and is installed at a position different from a position where the control device 40 is installed, to suppress an influence of heat generated in the motor drive circuit 50.

The control device 40 includes a control unit 40A and a phase difference adjusting unit 40B. The control unit 40A includes, as function blocks, a main control unit 41, a first coil system control unit 42, and a second coil system control unit 44. The phase difference adjusting unit 40B includes, as function blocks, a first phase adjusting unit 43 and a second phase adjusting unit 45.

The motor drive circuit 50 includes a first motor drive circuit 50A and a second motor drive circuit 50B. The first motor drive circuit 50A supplies a three-phase AC first motor drive current to the first coil groups G1 based on the command value. The second motor drive circuit 50B supplies a three-phase AC second motor drive current to the second coil groups G2. The first motor drive circuit 50A includes a first gate drive circuit 51 and a first inverter 52. The second motor drive circuit 50B includes a second gate drive circuit 53 and a second inverter 54.

The main control unit 41 acquires the steering torque T input to the input shaft 82a from the torque sensor 91a. The main control unit 41 calculates a current value as a command value for rotating and driving the motor rotor 20 according to the information acquired from the torque sensor 91a. The first coil system control unit 42 calculates a first pulse width modulation signal with a predetermined duty ratio, based on the command value of the main control unit 41. The first coil system control unit 42 transmits information of the first pulse width modulation signal to the first phase adjusting unit 43. The second coil system control unit 44 calculates a second pulse width modulation signal with a predetermined duty ratio, based on the command value of the main control unit 41. The second coil system control unit 44 transmits information of the second pulse width modulation signal to the second phase adjusting unit 45. In the first embodiment, the first phase adjusting unit 43 and the second phase adjusting unit 45 adjust a phase of a current to be supplied to the first coil groups G1 and a phase of a current to be supplied to the second coil groups G2 to become the same. At the time when the first coil system control unit 42 and the second coil system control unit 44 output the signals, if there is no phase difference between the information of the first pulse width modulation signal and the information of the second pulse width modulation signal, and these signals are synchronized with each other, the phase difference adjusting unit 40B may not be provided. The first phase adjusting unit 43 transmits information of the adjusted first pulse width modulation signal to the first gate drive circuit 51. The second phase adjusting unit 45 transmits information of the adjusted second pulse width modulation signal to the second gate drive circuit 53.

The first gate drive circuit 51 controls the first inverter 52 based on the information of the first pulse width modulation signal acquired from the first phase adjusting unit 43. The first inverter 52 switches a field effect transistor on and off to generate the three-phase alternating currents including a first U phase, a first V phase, and a first W phase, and having three-phase current values according to the duty ratio of the first pulse width modulation signal in the first gate drive circuit 51. The three-phase alternating currents generated by the first inverter 52 are sent to the motor 10 through three wires Lu1, Lv1, and Lw1, and excite the first coils 37. The wire Lu1 sends a first U-phase current to the motor 10. The wire Lv1 sends a first V-phase current to the motor 10. The wire Lw1 sends a first W-phase current to the motor 10.

The second gate drive circuit 53 controls the second inverter 54 based on the information of the second pulse width modulation signal acquired from the second phase adjusting unit 45. The second inverter 54 switches a field effect transistor on and off to generate the three-phase alternating currents including a second U phase, a second V phase, and a second W phase, and having three-phase current values according to the duty ratio of the second pulse width modulation signal in the second gate drive circuit 53. The three-phase alternating currents generated by the second inverter 54 are sent to the motor 10 through three wires Lu2, Lv2, and Lw2, and excite the second coils 38. The wire Lu2 sends a second U-phase current to the motor 10. The wire Lv2 sends a second V-phase current to the motor 10. The wire Lw2 sends a second W-phase current to the motor 10.

As described above, the control device 40 supplies the first pulse width modulation signal and the second pulse width modulation signal with a predetermined duty ratio, which serve as the current values for desirably rotating and driving the motor rotor 20, to the first gate drive circuit 51 and the second gate drive circuit 53, thereby controlling the first motor drive circuit 50A and the second motor drive circuit 50B.

Figure 6:
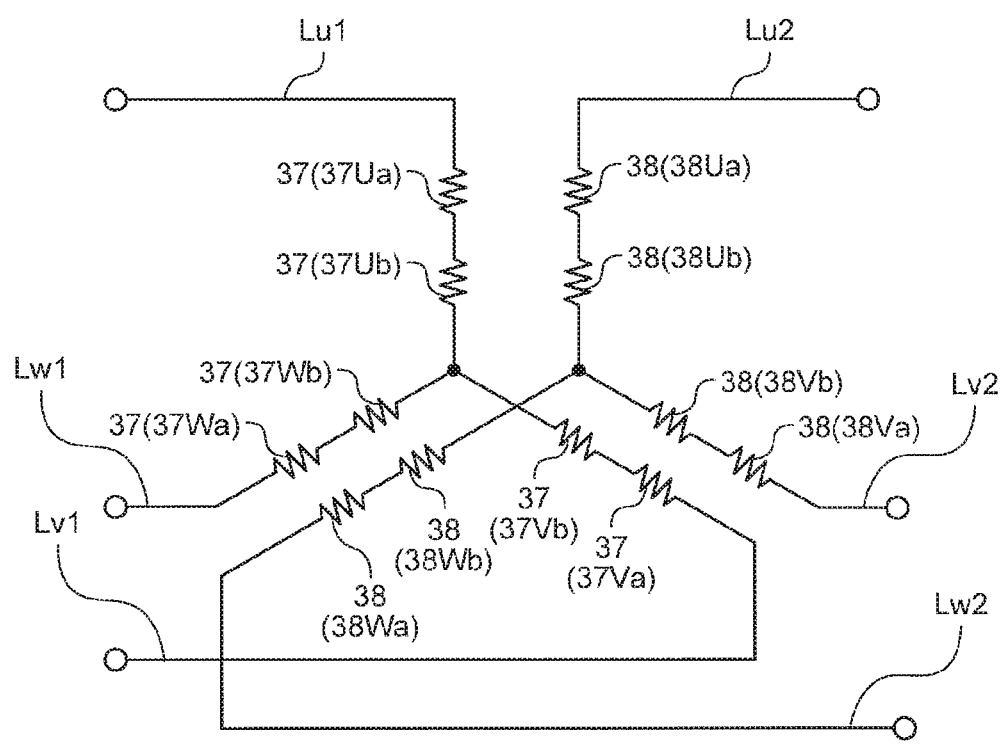
FIG. 6 is a schematic diagram illustrating wires of first coils and wires of second coils.

FIG. 6 is a schematic diagram illustrating the wires of the first coils and the second coils. As illustrated in FIG. 6, the six first coils 37 include two first U-phase coils 37Ua and 37Ub that are excited by the first U-phase current, two first V-phase coils 37Va and 37Vb that are excited by the first V-phase current, and two first W-phase coils 37Wa and 37Wb that are excited by the first W-phase current. The first U-phase coil 37Ub is connected with the first U-phase coil 37Ua in series. The first V-phase coil 37Vb is connected with the first V-phase coil 37Va in series. The first W-phase coil 37Wb is connected with the first W-phase coil 37Wa in series. All of the first coils 37 are wound around the teeth 34 in the same winding direction. Further, the wires Lu1, Lv1, and Lw1 are connected by Y-connection.

As illustrated in FIG. 6, the six second coils 38 include two second U-phase coils 38Ua and 38Ub that are excited by the second U-phase current, two second V-phase coils 38Va and 38Vb that are excited by the second V-phase current, and two second W-phase coils 38Wa and 38Wb that are excited by the second W-phase current. The second U-phase coil 38Ub is connected with the second U-phase coil 38Ua in series. The second V-phase coil 38Vb is connected with the second V-phase coil 38Va in series. The second W-phase coil 38Wb is connected with the second W-phase coil 38Wa in series. All of the second coils 38 are wound around the teeth 34 in the same winding direction, which is the same as the winding direction of the first coils 37. Further, the wires Lu2, Lv2, and Lw2 are connected by Y-connection.

As illustrated in FIG. 6, the motor of the first embodiment that includes the Y-connected six first coils 37 and the Y-connected six second coils 38 has been exemplarily described. However, a motor including A-connected six first coils 37 and A-connected six second coils 38 may be employed.

As illustrated in FIG. 4, the three first coil groups G1 are constituted of a first UV coil group G1UV, a first VW coil group G1VW, and a first UW coil group G1UW. The first UV coil group G1UV includes the first U-phase coil 37Ub and the first V-phase coil 37Va adjacent to each other in the circumferential direction. The first VW coil group G1VW includes the first V-phase coil 37Vb and the first W-phase coil 37Wa adjacent to each other in the circumferential direction. The first UW coil group G1UW includes the first U-phase coil 37Ua and the first W-phase coil 37Wb adjacent to each other in the circumferential direction.

As illustrated in FIG. 4, the three second coil groups G2 are constituted of a second UV coil group G2UV, a second VW coil group G2VW, and a second UW coil group G2UW. The second UV coil group G2UV includes the second U-phase coil 38Ub and the second V-phase coil 38Va adjacent to each other in the circumferential direction. The second VW coil group G2VW includes the second V-phase coil 38Vb and the second W-phase coil 38Wa adjacent to each other in the circumferential direction. The second UW coil group G2UW includes the second U-phase coil 38Ua and the second W-phase coil 38Wb adjacent to each other in the circumferential direction.

The first coils 37 that are excited by the first U-phase current face the second coils 38 that are excited by the second U-phase current in the radial direction of the stator core 31. In the description below, the radial direction of the stator core 31 is simply described as the radial direction. For example, as illustrated in FIG. 4, the first U-phase coil 37Ua faces the second U-phase coil 38Ua in the radial direction, and the first U-phase coil 37Ub faces the second U-phase coil 38Ub in the radial direction.

The first coils 37 that are excited by the first V-phase current face the second coils 38 that are excited by the second V-phase current in the radial direction. For example, as illustrated in FIG. 4, the first V-phase coil 37Va faces the second V-phase coil 38Va in the radial direction, and the first V-phase coil 37Vb faces the second V-phase coil 38Vb in the radial direction.

The first coils 37 that are excited by the first W-phase current face the second coils 38 that are excited by the second W-phase current in the radial direction. For example, as illustrated in FIG. 4, the first W-phase coil 37Wa faces the second W-phase coil 38Wa in the radial direction, and the first W-phase coil 37Wb faces the second W-phase coil 38Wb in the radial direction.

As described above, the first coils 37 are excited by the first inverter 52, and the second coils 38 are excited by the second inverter 54. Accordingly, the first inverter 52 and the second inverter 54 supply the three-phase alternating currents to the motor 10 independently of each other. Therefore, even if it becomes impossible to supply a current to the second coils 38, the first coils 37 can drive the motor 10. Further, even if it becomes impossible to supply a current to the first coils 37, the second coils 38 can drive the motor 10. The following describes an exemplary case where it becomes impossible to supply a current to the second coils 38. Description of a case where it becomes impossible to supply a current to the first coils 37 is the same as the case of the second coils 38 and thus will not be repeated.

Further, the three first coil groups G1 each constituted of the first coils 37 are arranged in the circumferential direction at regular intervals. Accordingly, the distance between the first coil groups G1 in the circumferential direction becomes shorter than a case where two first coil groups G1 are arranged in the circumferential direction at regular intervals. Therefore, even if it becomes impossible to supply a current to the second coils 38, variation of positions in the circumferential direction where the first coils 37 generate torque becomes small. Therefore, the motor 10 can suppress an increase in torque ripple even in the case of drive only by one of the two coil systems that are excited independently of each other.

Further, the three first coil groups G1 are constituted of the first UV coil group G1UV, the first VW coil group G1VW, and the first UW coil group G1UW. The second coil groups G2 are constituted of the second UV coil group G2UV, the second VW coil group G2VW, and the second UW coil group G2UW. Accordingly, two first coils 37 excited by the same-phase current do not belong to one first coil group G1, and two second coils 38 excited by the same phase current do not belong to one second coil group G2. The two first coils 37 excited by the same phase current indicate any of the two first U-phase coils 37Ua and 37Ub, the two first V-phase coils 37Va and 37Vb, and the two first W-phase coils 37Wa and 37Wb. Therefore, positions where the torque is generated tend to be dispersed in the circumferential direction. Therefore, the motor 10 can further suppress the torque tipple.

In the case of using the technology of Prior Art 1, when the motor is driven by one of the two systems, coils arranged at an end portion in the circumferential direction of the system are those excited by specific two phases (any of the combinations of a U phase and a V phase, a V phase and a W phase, and a U phase and a W phase). Accordingly, a generation amount of torque tends to vary according to change of the phases of the three-phase alternating currents, and thus the torque ripple may be increased. On the other hand, in the motor 10 according to the first embodiment, the first U-phase coils 37Ua and 37Ub, the first V-phase coils 37Va and 37Vb, or the first W-phase coils 37Wa and 37Wb are arranged at an end portion of the first coil groups G1 in the circumferential direction. The second U-phase coils 38Ua and 38Ub, the second V-phase coils 38Va and 38Vb, or the second W-phase coils 38Wa and 38Wb are arranged at an end portion of the second coil groups G2 in the circumferential direction. Accordingly, in the motor 10, the generation amount of the torque hardly varies according to change of the phases of the three-phase alternating currents. Therefore, an increase in the torque ripple can be further suppressed.

The column assist system of the electric power steering device 80 of the first embodiment has been exemplarily described. However, a pinion assist system and a rack assist system can also be employed.

As described above, the motor 10 is provided with the annular stator core 31 including the annular back yoke 33 and the teeth 34 arranged side by side in the circumferential direction on the inner circumferential surface of the back yoke 33. The motor 10 includes the 3n first coil groups G1 (three in the first embodiment) that are arranged in the circumferential direction of the stator core 31 at regular intervals, where n is an integer. Each of the first coil groups G1 is constituted of the first coils 37 (two in the first embodiment) that are respectively wound in a concentrated manner around the teeth 34 (two in the first embodiment) that are arranged adjacent to each other and excited by the first inverter 52 configured to generate the three-phase alternating currents including the first U phase, the first V phase, and the first W phase. The motor 10 includes the 3n second coil groups G2 (three in the first embodiment) that are arranged in the circumferential direction of the stator core 31 at regular intervals. Each of the second coil groups G2 is constituted of the second coils 38 (two in the first embodiment) that are respectively wound in a concentrated manner around the teeth 34 (two in the first embodiment) that are arranged adjacent to each other at positions, different from positions of the teeth 34 around which the first coils 37 are wound in a concentrated manner, and that are excited by the second inverter 54 configured to generate the three-phase alternating currents including the second U phase, the second V phase, and the second W phase.

Accordingly, the distance between the first coil groups G1 in the circumferential direction becomes shorter than the case where two first coil groups G1 are arranged in the circumferential direction at regular intervals. Therefore, even if it becomes impossible to supply a current to the second coils 38, variation of the positions where the first coils 37 generate the torque in the circumferential direction becomes small. Therefore, the motor 10 can suppress an increase in torque ripple, even in the case of drive by only one of the two coil systems that are excited independently of each other.

Further, the first coils 37 (six in the first embodiment) include the first U-phase coils 37Ua and 37Ub (two in the first embodiment) that are excited by the first U-phase current, the first V-phase coils 37Va and 37Vb (two in the first embodiment) that are excited by the first V-phase current, and the first W-phase coils 37Wa and 37Wb (two in the first embodiment) that are excited by the first W-phase current. The second coils 38 (six in the first embodiment) include the second U-phase coils 38Ua and 38Ub (two in the first embodiment) that are excited by the second U-phase current, the second V-phase coils 38Va and 38Vb (two in the first embodiment) that are excited by the second V-phase current, and the second W-phase coils 38Wa and 38Wb (two in the first embodiment) that are excited by the second W-phase current. The 3n first coil groups G1 (three in the first embodiment) are constituted of the first UV coil group G1UV including the first U-phase coil 37Ub and the first V-phase coil 37Va, the first VW coil group G1VW including the first V-phase coil 37Vb and the first W-phase coil 37Wa, and the first UW coil group G1UW including the first U-phase coil 37Ua and the first W-phase coil 37Wb. The 3n second coil groups G2 (three in the first embodiment) include the second UV coil group G2UV including the second U-phase coil 38Ub and the second V-phase coil 38Va, the second VW coil group G2VW including the second V-phase coil 38Vb and the second W-phase coil 38Wa, and the second UW coil group G2UW including the second U-phase coil 38Ua and the second W-phase coil 38Wb.

Accordingly, two first coils 37 excited by the same phase current do not belong to one first coil group G1, and two second coils 38 excited by the same phase current do not belong to one second coil group G2. Therefore, positions where the torque is generated tend to be dispersed in the circumferential direction. Therefore, the motor 10 can further suppress the torque ripple.

(First Modification)

Figure 7:
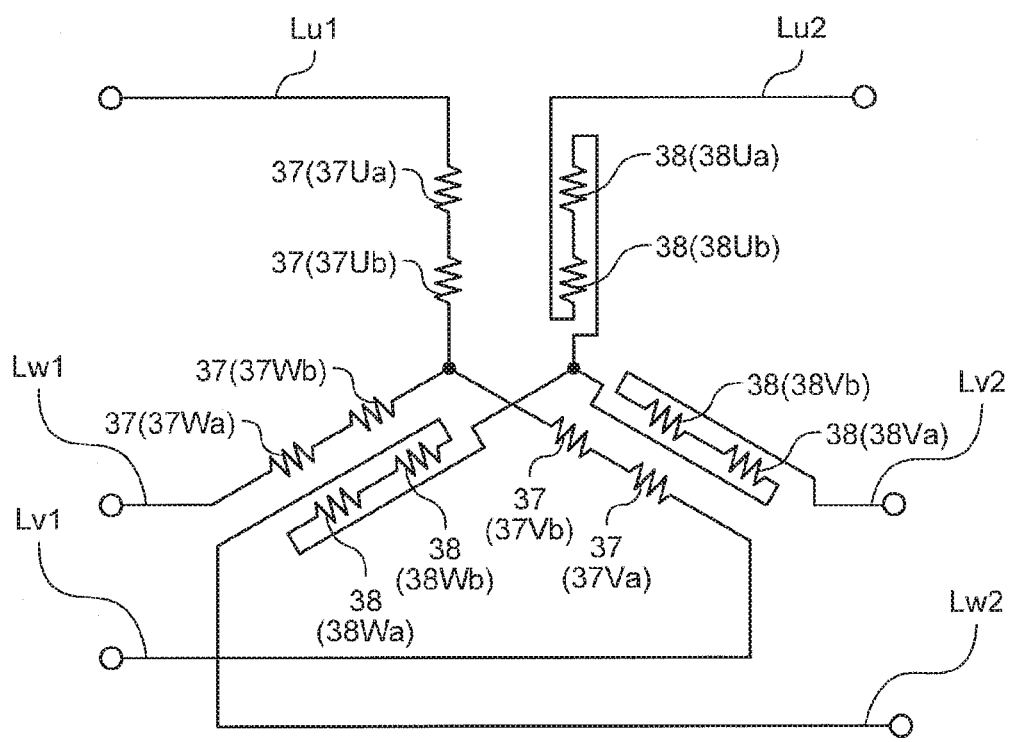
FIG. 7 is a schematic diagram illustrating wires of first coils and wires of second coils according to a first modification.

FIG. 7 is a schematic diagram illustrating wires of first coils and wires of second coils according to a first modification. The same configuration elements as those described in the first embodiment are denoted with the same reference signs, and overlapping description is omitted.

In a motor 10 according to the first modification, a winding direction in which second coils 38 are wound around teeth 34 is opposite to a winding direction in which first coils 37 are wound around teeth 34. Further, in the motor 10 according to the first modification, a first phase adjusting unit 43 and a second phase adjusting unit 45 adjust a phase of a current to be supplied to a first coil group G1 and a phase of a current to be supplied to a second coil group G2 to become different from each other by 180°. Accordingly, directions of magnetic fields generated by the first coils 37 and the second coils 38 become the same as those of the first embodiment.

Since the winding direction in which the second coils 38 are wound around the teeth 34 are opposite to the winding direction in which the first coils 37 are wound around the teeth 34, a position to start winding the first coils 37 around the teeth 34 is different from a position to start winding the second coils 38 around the teeth 34. For example, if the first coils 37 are started to be wound around the teeth 34 from an outside end portion of the teeth 34 in the radial direction, the second coils 38 are started to be wound around the teeth 34 from an inside end portion of the teeth 34 in the radial direction. Therefore, as illustrated in FIG. 7, end portions of the wires Lu1, Lv1, and Lw1, at a side connected to the first inverter 52, are positioned closer to the outside of the motor 10 in the radial direction, and end portions of the wires Lu2, Lv2, and Lw2, at a side connected to the second inverter 54, are positioned closer to the inside of the motor 10 in the radial direction. Therefore, positions of the wires connected to the motor 10 tend to vary. Therefore, the motor 10 according to the first modification can reduce a possibility of mutual interference among the wires.

Further, the phase of the current to be supplied to the first coil groups G1 and the phase of the current to be supplied to the second coil groups G2 are different from each other by 180°. Therefore, radiation noise from the wires Lu1, Lv1, and Lw1 between the first inverter 52 and the motor 10 and radiation noise from the wires Lu2, Lv2, and Lw2 between the second inverter 54 and the motor 10 offset each other. Therefore, the radiation noise generated in the wires between an ECU 90 and the motor 10 are reduced.

(Second Modification)

Figure 8:
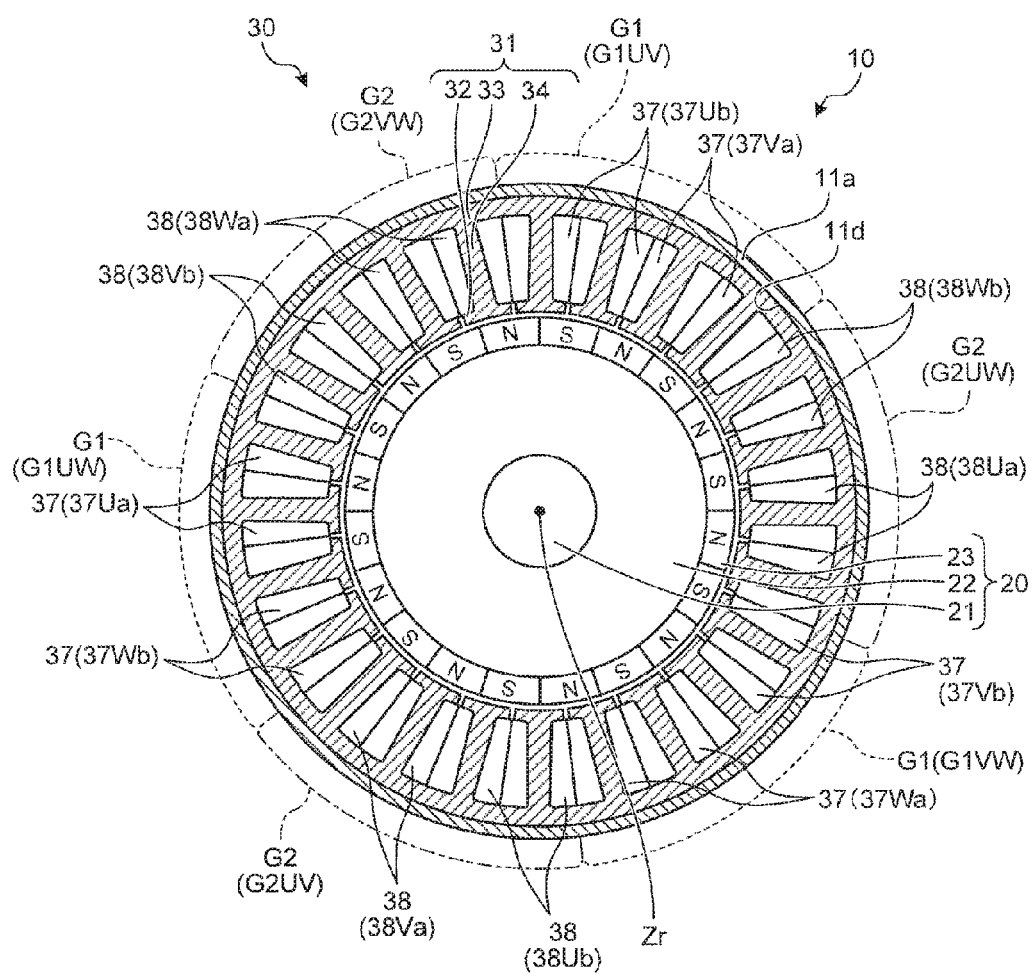
FIG. 8 is a sectional view schematically illustrating a configuration of a motor according to a second modification by cutting the motor in a virtual plane perpendicular to a central axis.

FIG. 8 is a sectional view schematically illustrating a configuration of a motor according to a second modification by cutting the motor in a virtual plane perpendicular to a central axis. As illustrated in FIG. 8, N poles and S poles are alternately arranged on an outer circumferential side of a rotor yoke 22 in a circumferential direction of the rotor yoke 22, and the number of poles of a motor rotor 20 in the second modification is 20. Further, twenty-four teeth 34 are arranged in the circumferential direction.

As illustrated in FIG. 8, in the second modification, twelve first coils 37 are arranged. The twelve first coils 37 are arranged such that four first coils 37 are adjacent to one another in the circumferential direction. Three first coil groups G1, each including the adjacent four first coils 37 as one group, are arranged in the circumferential direction at regular intervals. The three first coil groups G1 are constituted of a first UV coil group G1UV, a first VW coil group G1VW, and a first UW coil group G1UW.

The first UV coil group G1UV is constituted of two sets including a set of two first U-phase coils 37Ub and a set of two first V-phase coils 37Va. The two first U-phase coils 37Ub are arranged adjacent to each other in the circumferential direction, and are wound around the teeth 34 in mutually opposite winding directions. The two first V-phase coils 37Va are arranged adjacent to each other in the circumferential direction, and are wound around the teeth 34 in mutually opposite winding directions. The first VW coil group G1VW is constituted of two sets including a set of two first V-phase coils 37Vb and a set of two first W-phase coils 37Wa. The two first V-phase coils 37Vb are arranged adjacent to each other in the circumferential direction, and are wound around the teeth 34 in mutually opposite winding directions. The two first W-phase coils 37Wa are arranged adjacent to each other in the circumferential direction, and are wound around the teeth 34 in mutually opposite winding directions. The first UW coil group G1UW is constituted of two sets including a set of two first U-phase coils 37Ua and a set of two first W-phase coils 37Wb. The two first U-phase coils 37Ua are arranged adjacent to each other in the circumferential direction, and are wound around the teeth 34 in mutually opposite winding directions. The two first W-phase coils 37Wb are arranged adjacent to each other in the circumferential direction, and are wound around the teeth 34 in mutually opposite winding directions.

The pair of first U-phase coils 37Ua are connected with each other in series, the pair of first V-phase coils 37Va are connected with each other in series, the pair of first W-phase coils 37Wa are connected with each other in series, the pair of first U-phase coils 37Ub are connected with each other in series, the pair of first V-phase coils 37Vb are connected with each other in series, and the pair of first W-phase coils 37Wb are connected with each other in series. Further, the pair of first U-phase coils 37Ub are connected with the pair of first U-phase coils 37Ua in series. The pair of first V-phase coils 37Vb are connected with the pair of first V-phase coils 37Va in series. The pair of first W-phase coils 37Wb are connected with the pair of first W-phase coils 37Wa in series.

As illustrated in FIG. 8, in the second modification, twelve second coils 38 are arranged. The twelve second coils 38 are arranged such that four second coils 38 are adjacent to one another in the circumferential direction. Three second coil groups G2, each including the adjacent four second coils 38 as one group, are arranged in the circumferential direction at regular intervals. The three second coil groups G2 are constituted of a second UV coil group G2UV, a second VW coil group G2VW, and a second UW coil group G2UW.

The second UV coil group G2UV is constituted of two sets including a set of two second U-phase coils 38Ub and a set of two second V-phase coils 38Va. The two second U-phase coils 38Ub are arranged adjacent to each other in the circumferential direction, and are wound around the teeth 34 in mutually opposite winding directions. The two second V-phase coils 38Va are arranged adjacent to each other in the circumferential direction, and are wound around the teeth 34 in mutually opposite winding directions. The second VW coil group G2VW is constituted of two sets including a set of two second V-phase coils 38Vb and a set of two second W-phase coils 38Wa. The two second V-phase coils 38Vb are arranged adjacent to each other in the circumferential direction, and are wound around the teeth 34 in mutually opposite winding directions. The two second W-phase coils 38Wa are arranged adjacent to each other in the circumferential direction, and are wound around the teeth 34 in mutually opposite winding directions. The second UW coil group G2UW is constituted of two sets including a set of two second U-phase coils 38Ua and a set of two second W-phase coils 38Wb. The two second U-phase coils 38Ua are arranged adjacent to each other in the circumferential direction, and are wound around the teeth 34 in mutually opposite winding directions. The two second W-phase coils 38Wb are arranged adjacent to each other in the circumferential direction, and are wound around the teeth 34 in mutually opposite winding directions.

The pair of second U-phase coils 38Ua are connected with each other in series, the pair of second V-phase coils 38Va are connected with each other in series, the pair of second W-phase coils 38Wa are connected with each other in series, the pair of second U-phase coils 38Ub are connected with each other in series, the pair of second V-phase coils 38Vb are connected with each other in series, and the pair of second W-phase coils 38Wb are connected with each other in series. Further, the pair of second U-phase coils 38Ub are connected with the pair of second U-phase coils 38Ua in series. The pair of second V-phase coils 38Vb are connected with the pair of second V-phase coils 38Va in series. The pair of second W-phase coils 38Wb are connected with the pair of second W-phase coils 38Wa in series.

In the second modification, the pair of first coils 37 are excited to form magnetic fields in mutually opposite directions. The pair of second coils 38 are excited to form magnetic fields in mutually opposite directions. Accordingly, the first coils 37 and the second coils 38 to be excited in mutually opposite directions are alternately arranged in the circumferential direction.

Therefore, in a motor 10 according to the second modification, the number of magnetic poles is larger than that of the first embodiment. Therefore, in the motor 10 according to the second modification, positions where torque is generated tend to be dispersed in the circumferential direction. Therefore, the motor 10 according to the second modification can further suppress torque ripple.

(Third Modification)

Figure 9:
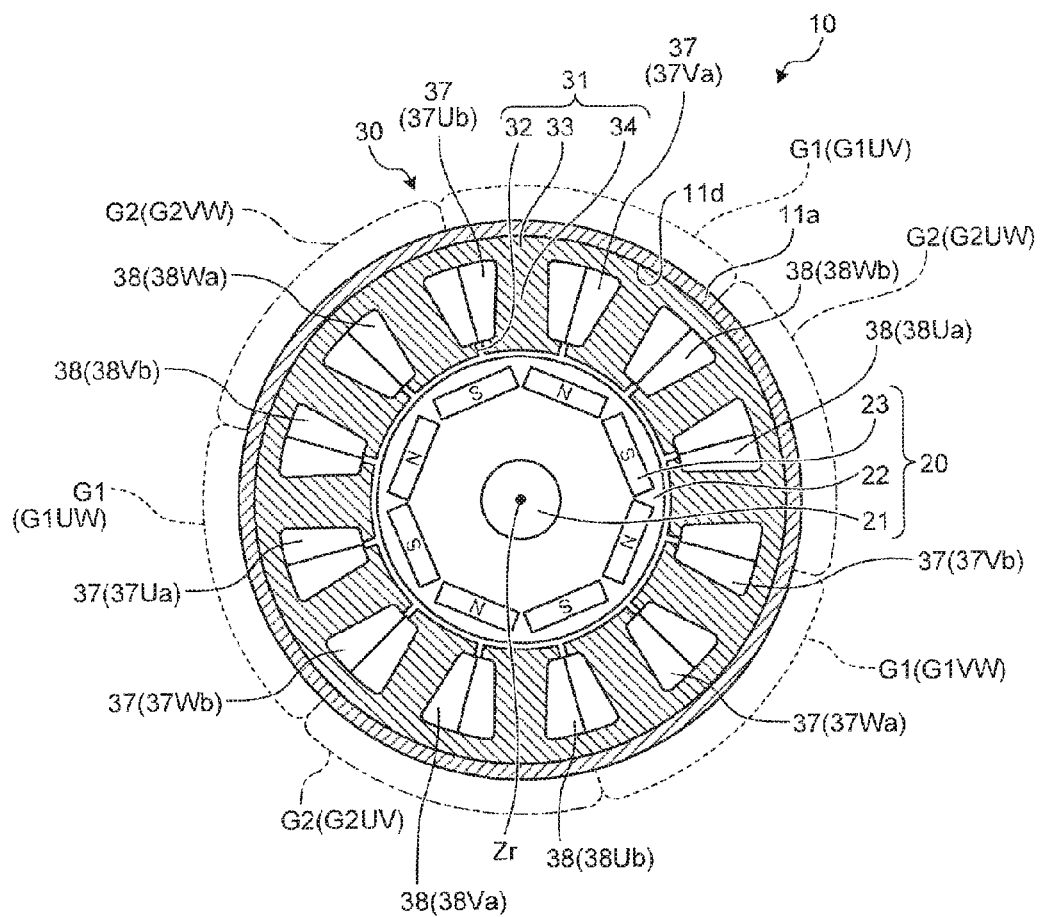
FIG. 9 is a sectional view schematically illustrating a configuration of a motor according to a third modification by cutting the motor in a virtual plane perpendicular to a central axis.

FIG. 9 is a sectional view schematically illustrating a configuration of a motor according to a third modification by cutting the motor in a virtual plane perpendicular to a central axis. In the third modification, magnets 23 are embedded in a plurality of slots provided in a rotor yoke 22. The magnets 23 are arranged inside an outer circumferential surface of the rotor yoke 22 in a radial direction. Accordingly, a motor 10 according to the third modification can generate torque to which reluctance torque is added.

Second Embodiment

Figure 10:
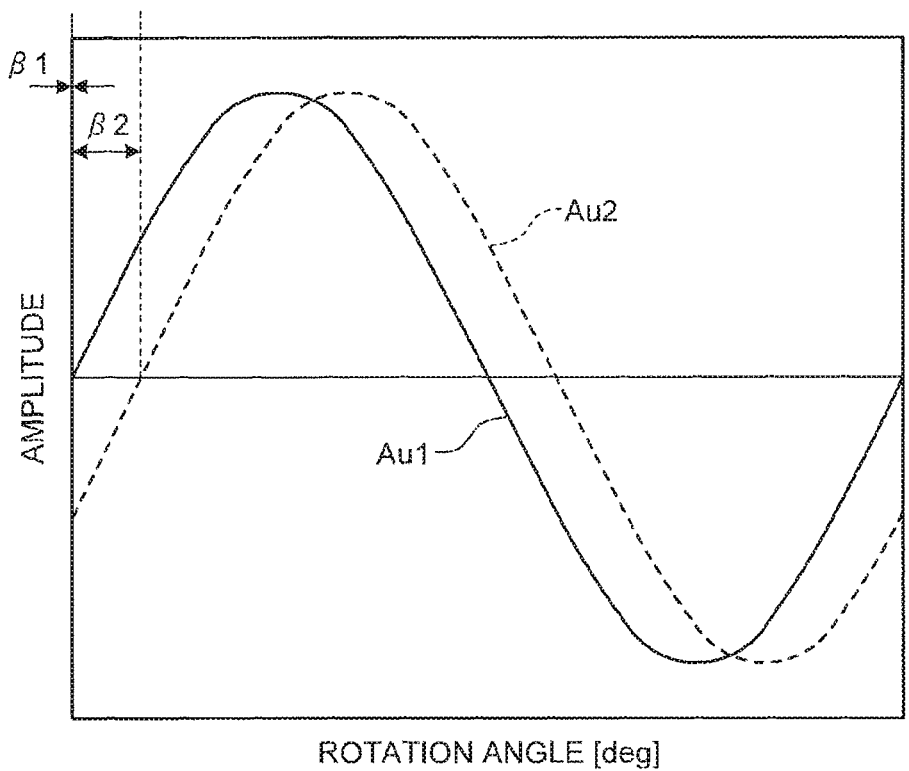
FIG. 10 is a diagram for explaining waveforms of first U-phase and second U-phase currents to be supplied to a motor according to the second embodiment.
Figure 11:
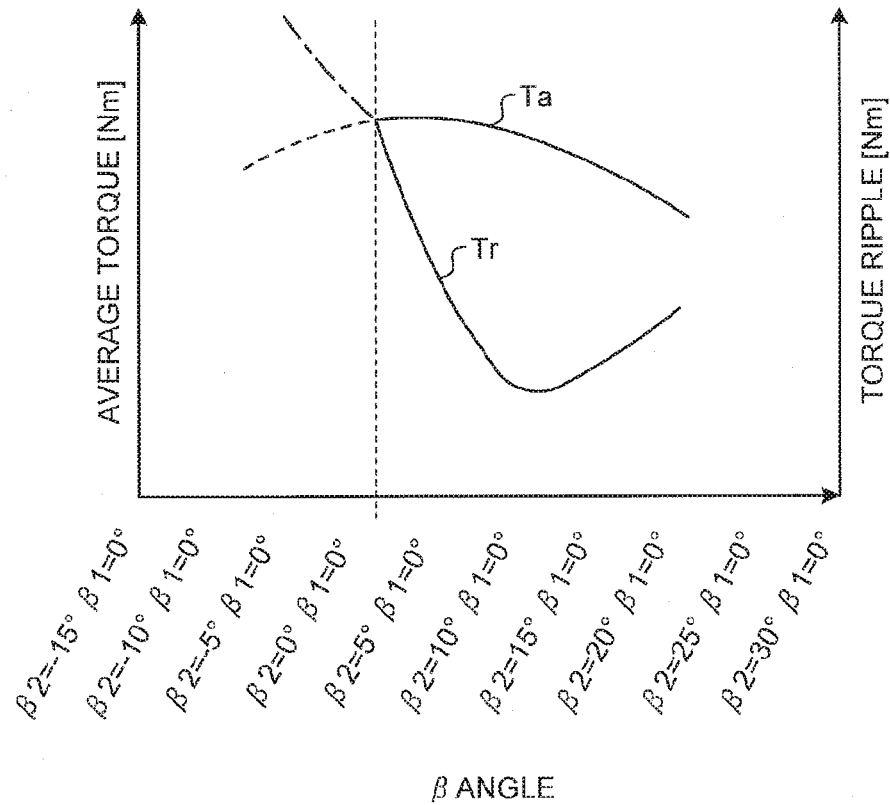
FIG. 11 is a diagram for explaining change amounts of average torque and torque ripple with respect to a phase difference between a phase of a first motor drive current and a phase of a second motor drive current.

FIG. 10 is a diagram for explaining waveforms of first U-phase and second U-phase currents to be supplied to a motor according to a second embodiment. FIG. 11 is a diagram for explaining change amounts of average torque and torque ripple with respect to a phase difference between a phase of a first motor drive current and a phase of a second motor drive current. A motor 10 and a motor control device 100 according to the second embodiment are the same as the motor 10 and the motor control device 100 according to the first embodiment illustrated in FIGS. 1 to 6, but an operation of a phase difference adjusting unit 40B of a control device 40 is different. Hereinafter, description will be given with reference to FIGS. 1 to 6, and FIGS. 10 and 11 as appropriate. The same configuration elements as those described in the first embodiment are denoted with the same reference signs and overlapping description is omitted.

As illustrated in FIG. 5, a main control unit 41 acquires steering torque T input to an input shaft 82a from a torque sensor 91a. The main control unit 41 calculates a current value as a command value for rotating and driving a motor rotor 20 according to information acquired from the torque sensor 91a. A first coil system control unit 42 calculates a first pulse width modulation signal with a predetermined duty ratio, based on the command value from the main control unit 41. The first coil system control unit 42 transmits information of the first pulse width modulation signal to a first phase adjusting unit 43. A second coil system control unit 44 calculates a second pulse width modulation signal with a predetermined duty ratio, based on the command value from the main control unit 41. The second coil system control unit 44 transmits information of the second pulse width modulation signal to a second phase adjusting unit 45.

In the second embodiment, the first phase adjusting unit 43 and the second phase adjusting unit 45 adjust a phase of a current to be supplied to second coil groups G2 such that the phase is advanced with respect to a phase of a current to be supplied to first coil groups G1. The first phase adjusting unit 43 transmits information of the adjusted first pulse width modulation signal to a first gate drive circuit 51. The second phase adjusting unit 45 transmits information of the adjusted second pulse width modulation signal to a second gate drive circuit 53.

The first gate drive circuit 51 controls a first inverter 52 based on the information of the first pulse width modulation signal acquired from the first phase adjusting unit 43. The first inverter 52 switches a field effect transistor on and off to generate three-phase alternating currents including a first U phase, a first V phase, and a first W phase, and having three-phase current values according to the duty ratio of the first pulse width modulation signal in the first gate drive circuit 51. The three-phase alternating currents generated by the first inverter 52 are sent to the motor 10 through three wires Lu1, Lv1, and Lw1, and excite a plurality of first coils 37. The wire Lu1 sends a first U-phase current to the motor 10. The wire Lv1 sends a first V-phase current to the motor 10. The wire Lw1 sends a first W-phase current to the motor 10.

The second gate drive circuit 53 controls a second inverter 54 based on the information of the second pulse width modulation signal acquired from the second phase adjusting unit 45. The second inverter 54 switches a field effect transistor on and off to generate three-phase alternating currents including a second U phase, a second V phase, and a second W phase, and having three-phase current values according to the duty ratio of the second pulse width modulation signal in the second gate drive circuit 53. The three-phase alternating currents generated by the second inverter 54 are sent to the motor 10 through three wires Lu2, Lv2, and Lw2, and excite a plurality of second coils 38. The wire Lu2 sends a second U-phase current to the motor 10. The wire Lv2 sends a second V-phase current to the motor 10. The wire Lw2 sends a second W-phase current to the motor 10.

Similarly to the first embodiment, the first motor drive currents are symmetrical three-phase alternating currents of the first U phase, the first V phase, and the first W phase, which have sine waves each shifted by 120° in electrical angle. Further, the second motor drive currents are symmetrical three-phase alternating currents of the second U phase, the second V phase, and the second W phase, which have sine waves each shifted by 120° in electrical angle. Regarding the phase difference between the first motor drive currents and the second motor drive currents, a phase difference between the first U phase and the second U phase is the same as a phase difference between the first V phase and the second V phase, and a phase difference between the first W phase and the second W phase. Therefore, the phase difference between the first motor drive currents and the second motor drive currents will be described with reference to the phase difference between the first U phase and the second U phase illustrated in FIG. 10.

As illustrated in FIG. 10, a phase difference β1 between a first U-phase current Au1 of the first motor drive current and a reference phase is 0. The reference phase is a phase in which a phase difference between first U-phase counter-electromotive force and a current of a phase corresponding to the counter-electromotive force is 0°. The three first coil groups G1 are arranged in the circumferential direction of the stator core 31 at regular intervals. Therefore, when taking account of only the first coil groups G1, it can be considered that rotational torque proportional to the current to be supplied to the first coil groups G1 is generated, and average torque becomes constant regardless of a rotation angle of the motor rotor 20. However, a second U-phase current Au2 of the second motor drive current is advanced with respect to a reference phase by a phase difference $\beta2$. The reference phase is a phase in which a phase difference between second U-phase counter-electromotive force and a current of a phase corresponding to the counter-electromotive force is 0. Therefore, as illustrated in FIG. 11, average torque Ta decreases as the phase difference $\beta2$ becomes larger than the reference phase, due to interaction between the first coil groups G1 and the second coil groups G2. By the way, the inventors have found that the torque ripple Tr decreases as the phase difference $\beta2$ illustrated in FIG. 11 is advanced with respect to the reference phase, and the torque ripple Tr changes from decrease to increase at a predetermined extreme value, due to the interaction between the first coil groups G1 and the second coil groups G2. On the other hand, the torque ripple Tr is expected to increase as the phase difference $\beta2$ illustrated in FIG. 11 becomes smaller than the reference phase, due to the interaction between the first coil groups G1 and the second coil groups G2.

As illustrated in FIG. 11, when the phase difference $\beta1$ is 0, it is most preferable that the phase difference $\beta2$ is 10° in electrical angle.

As described above, the motor control device 100 according to the second embodiment includes the motor 10, the control device 40, and a motor drive circuit 50. The motor 10 includes the motor rotor 20, the motor stator 30, and a plurality of coil groups that are divided into the first coil groups G1 and the second coil groups G2 of at least two systems for each of three phases, and that excites the stator core 31 with the three-phase alternating currents. The control device 40 outputs a current value as a command value for rotating and driving the motor rotor 20. The motor drive circuit 50 includes a first motor drive circuit 50A and a second motor drive circuit 50B. The first motor drive circuit 50A supplies the three-phase AC first motor drive current to the first coil groups G1 based on the command value described above, and the second motor drive circuit 50B supplies the three-phase AC second motor drive current to the second coil groups G2. The second motor drive current has a phase difference from the first motor drive current such that the phase of the second motor drive current is advanced with respect to the phase of the first motor drive current.

Accordingly, when two first coil group G1 and second coil group G2 to be excited independently of each other are excited at the same time, torque ripple can be suppressed.

As described above, the control device 40 includes a control unit 40A that calculates a pulse width modulation signal with a predetermined duty ratio as a command value, and a phase difference adjusting unit 40B. The phase difference adjusting unit 40B calculates a second pulse width modulation signal from a first pulse width modulation signal that is the pulse width modulation signal with the predetermined duty ratio, such that the second pulse width modulation signal has the same duty ratio as the first pulse width modulation signal, and has a phase difference ($\beta2-\beta1$) from the first pulse width modulation signal. The phase difference adjusting unit 40B of the control device 40 adjusts the phase difference $\beta2$ in a range where the decreasing rate of the torque ripple is larger than the decreasing rate of the average torque, and the motor 10 is controlled to provide rotation with decreased torque ripple to the motor rotor 20. Further, the phase difference adjusting unit 40B can perform control to approximate the phase difference ($\beta2-\beta1$) to 0 to increase the average torque Ta, and increase the phase difference ($\beta2-\beta1$) to decrease the torque ripple Tr.

The first motor drive circuit 50A supplies the first motor drive current to the first coil groups G1 by PWM control of the first pulse width modulation signal, and the second motor drive circuit 50B supplies the second motor drive current to the second coil groups G2 by PWM control of the second pulse width modulation signal. Accordingly, the first motor drive circuit 50A and the second motor drive circuit 50B that are independent from each other are provided, whereby redundancy is enhanced, and fail safety of the motor drive circuit 50 can be enhanced.

The above-described phase difference ($\beta2-\beta1$) does not exceed 45° in electrical angle. Since the phase difference ($\beta2-\beta1$) does not exceed 45° in electrical angle, a decrease in the average torque Ta can be suppressed.

In the motor according to the second embodiment, output torque Ts is obtained by the following equation (1).

$$Ts=Tm+Tr \quad (1)$$

Here, Tm is torque by a magnetic flux $\phi m$ of magnets 23 and Tr is reluctance torque. The reluctance torque Tr is obtained by the following equation (2).

$$Tr=P(Lq-Ld) \times Iq \times Id \quad (2)$$

Here, P is the number of pole pairs of the magnets 23. Lq is q-axis inductance. Ld is d-axis inductance. Iq is a q-axis component of an armature current. Id is a d-axis component of the armature current.

Typically, according to the equation (2), it can be seen that the reluctance torque Tr can be made large if the q-axis inductance Lq is large and the d-axis inductance Ld is small. The torque Tm by the magnets 23 is determined by the following equation (3).

$$Tm=\phi m \times Iq \quad (3)$$

Here, $\phi m$ is a total amount of magnet magnetic flux of each pole pair.

As described above, the motor according to the second embodiment includes the first coil groups G1 and the second coil groups G2. Therefore, the output torque Ts of the motor according to the second embodiment can be considered separately as torque Tg1 by the first coil groups G1 and torque Tg2 by the second coil groups G2. That is, the output torque Ts is obtained by the following equation (4).

$$Ts=Tg1+Tg2 \quad (4)$$

The torque Tg1 is obtained by the following equation (5) when the formula (1) is applied.

$$Tg1=Tm1+Tr1 \quad (5)$$

Here, Tm1 is magnet torque by the magnetic flux $\phi m$ of the magnets 23 with respect to the first coil groups G1. Tr1 is the reluctance torque with respect to the first coil groups G1. Similarly, the torque Tg2 is obtained by the following equation (6) when the equation (1) is applied.

$$Tg2=Tm2+Tr2 \quad (6)$$

Here, Tm2 is magnet torque by the magnetic flux $\phi m$ of the magnets 23 with respect to the second coil groups G2. Tr2 is the reluctance torque with respect to the second coil groups G2.

Figure 12:
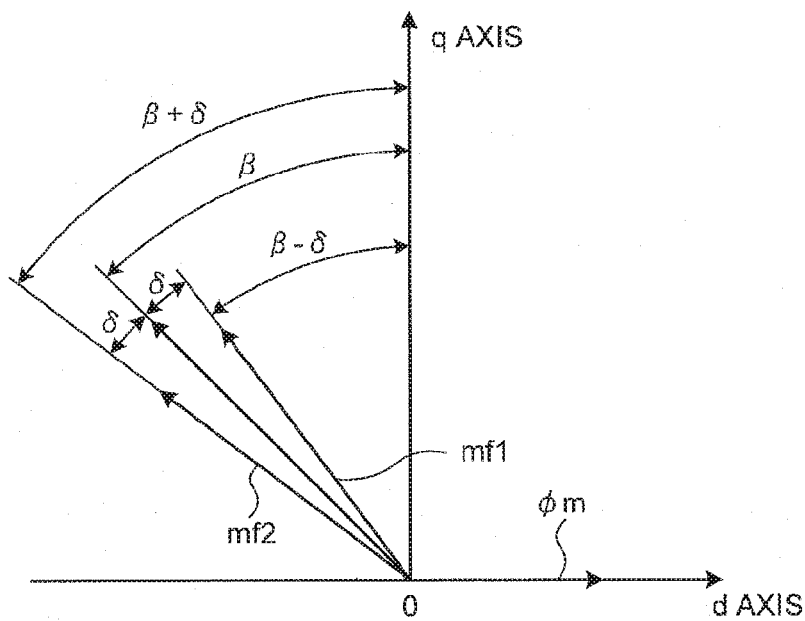
FIG. 12 is a diagram illustrating vector relationships between an armature magnetic flux of first coil groups and an armature magnetic flux of second coil groups in a d axis and a q axis.

FIG. 12 is a diagram illustrating vector relationships between an armature magnetic flux of the first coil groups and an armature magnetic flux of the second coil groups in a d axis and a q axis. The following describes a case in which a phase difference 2δ is provided between an armature magnetic flux mf1 of the first coil groups G1 and an armature magnetic flux mf2 of the second coil group G2 with respect to the q axis of a rotor magnetic pole, as illustrated in FIG. 12.

An addition average value of respective advance angles of the first coil groups G1 and the second coil groups G2 with respect to the q axis of the rotor magnetic pole is β.

An advance angle of a rotating magnetic field of the first coil groups G1 is (β−δ), based on the d axis of the rotor. Tm1 is obtained by the following equation (7) where an amplitude value of an input current is Ia.

$$Tm1 = \phi m \times Ia \times \cos(\beta - \delta) \quad (7)$$

Similarly, Tr1 is obtained by the following equation (8).

$$Tr1 = (Lq - Ld) \times Ia^2 \times \sin(\beta - \delta) \times \cos(\beta - \delta) \quad (8)$$

Tm2 is obtained by the following equation (9).

$$Tm2 = \phi m \times Ia \times \cos(\beta + \delta) \quad (9)$$

Similarly, Tr2 is obtained by the following equation (10).

$$Tr2 = (Lq - Ld) \times Ia^2 \times \sin(\beta + \delta) \times \cos(\beta + \delta) \quad (10)$$

β is from −90° to 90°, both inclusive. In the second embodiment, for easy understanding, a case where β=0° is considered. In this case, an addition value of a component of reluctance torque to the first coil groups G1 and a component of the reluctance torque to the second coil groups G2 is 0.

That is, when β=0 is assigned to the equations (8) and (10), the following equation (11) holds.

$$Tr1 + Tr2 = 0 \quad (11)$$

According to the equation (11), by intentionally shifting the phases of the torque waveforms of the first coil groups G1 and the second coil groups G2, the torque ripple components between the two groups of the first coil groups G1 and the second coil groups G2 are cancelled. As a result, the torque ripple components can be suppressed even if the stator winding wires are not skewed, for example.

Figure 13:
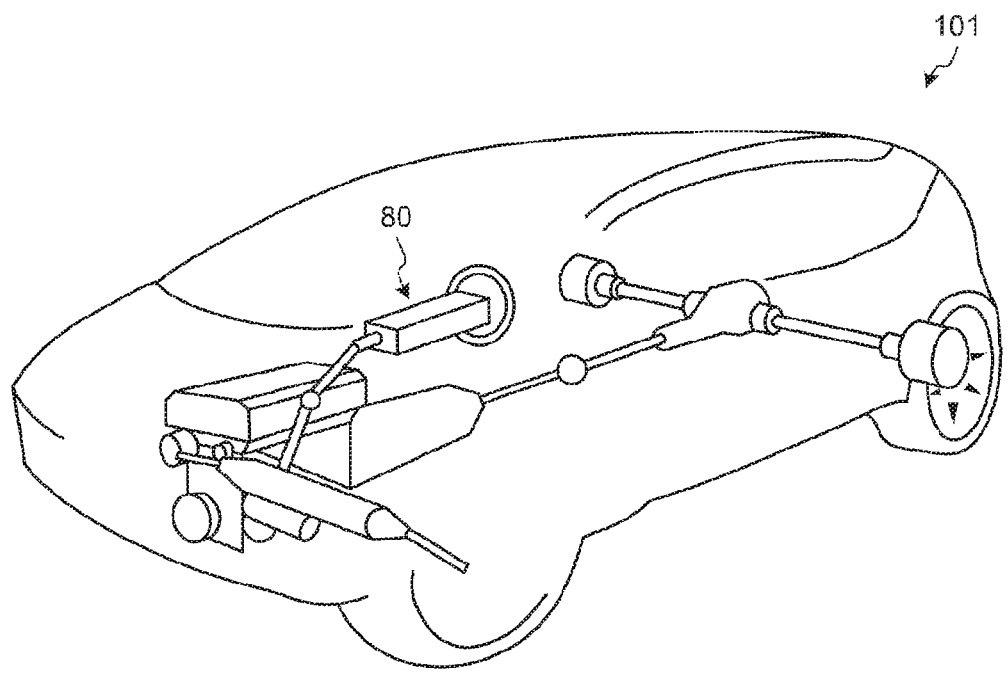
FIG. 13 is a schematic diagram of a vehicle on which the electric power steering device including the motor according to the first or second embodiment is mounted.

FIG. 13 is a schematic diagram of a vehicle on which the electric power steering device including the motor according to the first or second embodiment is mounted. As illustrated in FIG. 13, a vehicle 101 is provided with the electric power steering device 80 including the motor 10 according to the first or second embodiment. The vehicle 101 may be provided with the motor 10 according to the first or second embodiment for different use other than for the electric power steering device 80.

REFERENCE SIGNS LIST

10 MOTOR
11 HOUSING
11a CYLINDRICAL HOUSING
11d INNER CIRCUMFERENTIAL SURFACE
14 RESOLVER
20 MOTOR ROTOR
21 SHAFT
22 ROTOR YOKE
23 MAGNET
30 MOTOR STATOR
31 STATOR CORE
32 TOOTH TIP
33 BACK YOKE
34 TOOTH
37 FIRST COIL
37a INSULATOR
37Ua and 37Ub FIRST U-PHASE COIL
37Va and 37Vb FIRST V-PHASE COIL
37Wa and 37Wb FIRST W-PHASE COIL
38 SECOND COIL
38Ua and 38Ub SECOND U-PHASE COIL
38Va and 38Vb SECOND V-PHASE COIL
38Wa and 38Wb SECOND W-PHASE COIL
40 CONTROL DEVICE
41 MAIN CONTROL UNIT
42 FIRST COIL SYSTEM CONTROL UNIT
43 FIRST PHASE ADJUSTING UNIT
44 SECOND COIL SYSTEM CONTROL UNIT
45 SECOND PHASE ADJUSTING UNIT
51 FIRST GATE DRIVE CIRCUIT
52 FIRST INVERTER
53 SECOND GATE DRIVE CIRCUIT
54 SECOND INVERTER
80 ELECTRIC POWER STEERING DEVICE
100 MOTOR CONTROL DEVICE
101 VEHICLE
G1 FIRST COIL GROUP
G1UV FIRST UV COIL GROUP
G1VW FIRST VW COIL GROUP
G1UW FIRST UW COIL GROUP
G2 SECOND COIL GROUP
G2UV SECOND UV COIL GROUP
G2VW SECOND VW COIL GROUP
G2UW SECOND UW COIL GROUP
Lu1, Lv1, Lw1, Lu2, Lv2, and Lw2 WIRE
Zr ROTATION CENTER

The invention claimed is:

1. A motor control device comprising:
a motor including:
  a motor rotor;
  a motor stator including a stator core that rotates the motor rotor; and
  a plurality of coil groups divided into a first coil group and a second coil group of at least two systems for each of three phases, and configured to excite the stator core by three-phase alternating currents; and
a motor drive circuit including:
  a control device that outputs a current value as a command value for rotating and driving the motor rotor;
  a first motor drive circuit that supplies a three-phase AC first motor drive current to the first coil group, based on the command value; and
  a second motor drive circuit that supplies a three-phase AC second motor drive current having a phase difference from a phase of the first motor drive current, to the second coil group, wherein
the phase difference does not exceed 45° in electrical angle,
the stator core includes an annular back yoke, and a plurality of teeth arranged side by side in a circumferential direction on an inner circumferential surface of the back yoke,
when n is an integer, the 3n first coil groups are arranged in the circumferential direction of the stator core at regular intervals, each of the first coil groups being constituted of a plurality of first coils that are respectively wound, in a concentrated manner, around the teeth arranged adjacent to one another, and that are excited by a first inverter configured to generate three-phase alternating currents including a first U phase current, a first V phase current, and a first W phase current, when n is an integer, the 3n second coil groups are arranged in the circumferential direction of the stator core at regular intervals, each of the second coil groups being constituted of a plurality of second coils that are respectively wound, in a concentrated manner, around the teeth adjacent to one another in positions different from positions of the teeth around which the first coils are wound in a concentrated manner, and that are excited by a second inverter configured to generate three-phase alternating currents including a second U phase current, a second V phase current, and a second W phase current, the first coils include a plurality of first U-phase coils excited by the first U-phase current, a plurality of first V-phase coils excited by the first V-phase current, and a plurality of first W-phase coils excited by the first W-phase current, the second coils include a plurality of second U-phase coils excited by the second U-phase current, a plurality of second V-phase coils excited by the second V-phase current, and a plurality of second W-phase coils excited by the second W-phase current, the 3n first coil groups are constituted of a first UV coil group that is constituted of only the first U-phase coils and the first V-phase coils, a first VW coil group that is constituted of only the first V-phase coils and the first W-phase coils, and a first UW coil group that is constituted of only the first U-phase coils and the first W-phase coils, and the 3n second coil groups are constituted of a second UV coil group that is constituted of only the second U-phase coils and the second V-phase coils, a second VW coil group that is constituted of only the second V-phase coils and the second W-phase coils, and a second UW coil group that is constituted of only the second U-phase coils and the second W-phase coils.

2. The motor control device according to claim 1, wherein the control device includes:
   a control unit that calculates a pulse width modulation signal with a predetermined duty ratio as the command value; and
   a phase difference adjusting unit that calculates a second pulse width modulation signal from a first pulse width modulation signal that is the pulse width modulation signal with the predetermined duty ratio, such that the second pulse width modulation signal has the same duty ratio as the first pulse width modulation signal, and has a phase difference from the first pulse width modulation signal.

3. The motor control device according to claim 2, wherein the first motor drive circuit supplies the first motor drive current to the first coil group by PWM control of the first pulse width modulation signal, and
the second motor drive circuit supplies the second motor drive current to the second coil group by PWM control of the second pulse width modulation signal.

4. An electric power steering device configured to obtain auxiliary steering torque by the motor of the motor control device according to claim 1.

5. A vehicle on which the electric power steering device according to claim 4 is mounted.

* * * * *